UNITED STATES PATENT OFFICE.

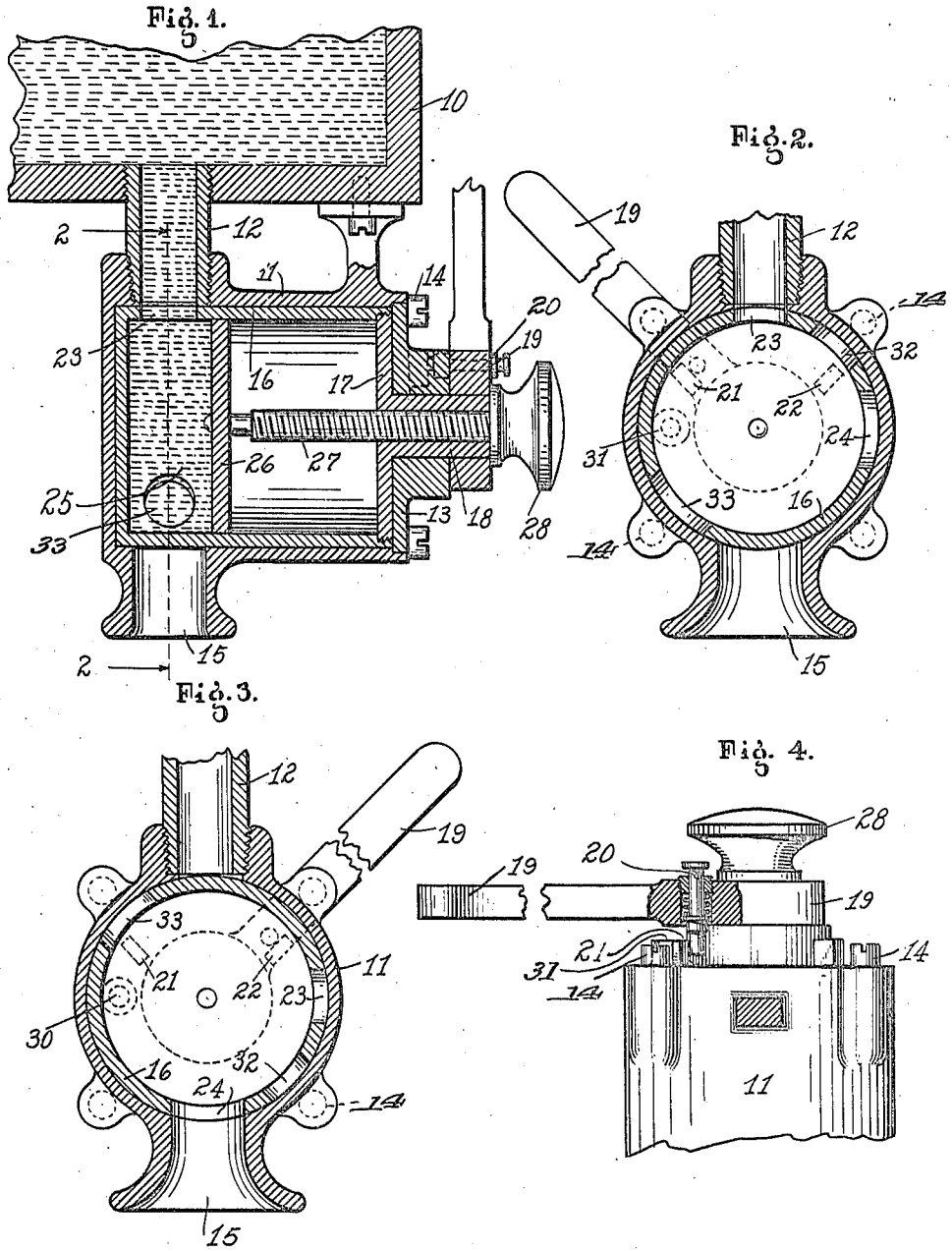

EVERETT IRISH AND CLARENCE R. IRISH, OF INDIANAPOLIS, INDIANA.

FLUID MEASURING AND DELIVERING DEVICE.

1,165,508. Specification of Letters Patent. Patented Dec. 28, 1915.

Application filed July 3, 1913. Serial No. 777,343.

*To all whom it may concern:*

Be it known that we, EVERETT IRISH and CLARENCE R. IRISH, citizens of the United States, and residents of Indianapolis, county of Marion, and State of Indiana, have invented a certain new and useful Fluid Measuring and Delivering Device; and we do hereby declare that the following is a full, clear, and exact description thereof, reference being had to the accompanying drawings, in which like letters refer to like parts.

The object of this invention is to provide an improved device for discharging relatively small amounts of fluid from a vessel or receptacle containing a relatively large quantity of fluid. The invention was made with particular reference for a device to be used in restaurants, hotels and the like, for supplying cream for cups of coffee and for that purpose the device is associated with a receptacle containing a relatively large quantity of cream and it measures off and discharges a uniform small quantity of cream so that the supply of cream for each cup of coffee will be substantially the same, and in connection therewith means is provided for varying the quantity of fluid which would be thus measured off and discharged.

While the invention has been made with reference to creaming cups of coffee, it is obviously not limited to that use.

The chief feature of the invention consists in mounting an oscillatory receptacle within a fixed cylinder, said fixed cylinder being in communication with a supply tank and having suitable discharge outlet below the inlet and the oscillatory cylinder having a measuring chamber in it of desired dimensions and a plurality of ports, one inlet and the other outlet, and arranged so that only one of said ports will be in registry with the corresponding ports in the fixed cylinder at the same time. Therefore, when the measuring cylinder is in one position, it will receive a charge of fluid, but will not discharge it at the time, and when oscillated, the inlet will be cut off and the outlet opened so as to discharge the contents. By providing a hand lever operable within different fixed limits, all that is necessary in operation is to throw the lever back and forth for creaming a cup of coffee or the like.

The full nature of the invention will be understood from the accompanying drawings and the following description and claim:

In the drawings, Figure 1 is a central vertical section through the device and through a portion of the supply tank, the device being shown in receiving position. Fig. 2 is a section on the line 2—2 of Fig. 1, with parts in the same position. Fig. 3 is the same as Fig. 2, with the parts in the other or discharging position. Fig. 4 is a plan view of a portion of the device with a portion thereof in section.

In the drawings herein there is shown a supply tank or receptacle 10 which may contain cream or any other fluid, and there is secured below the same a fixed cylinder or casing 11 and an inlet tube 12 extending from one vessel to the other so that the fluid will descend through the same by gravity. The cylinder or casing 11 has an open end adapted to be closed by a cap plate 13 and screws 14. There is also a discharge opening 15 from the lower end of said casing or cylinder 11 and under the inlet tube 12.

Within the fixed cylinder or casing 11, there is an oscillatory cylinder 16 which fits snugly therein, but so that it can be oscillated and it has also one end open and adapted to be closed by a screw cap 17. Said screw cap 17 has a sleeve 18 extending therefrom through the cap 13 so as to have bearings in the cap 13 and on the outer end of said sleeve a hand lever 19 is secured so that the cylinder 16 can be oscilated by actuating said lever.

The hand lever 19 is limited in its oscillatory movement by a spring bolt 20 extending through the same and provided with a spring which tends to force the same inward so as to engage one of the stops 21 or 22 extending outward from the cap 13. When the lever is thrown against stop 21, as shown in Fig. 2, the inlet port 23 of the cylinder 16 registers with the tube 12 and receives a charge or supply of the fluid from the tank 10. At that time the outlet port 24 from said cylinder 16 does not register with the outlet port 15 from the fixed casing. When, however, the lever is thrown over against the other stop 22, as shown in Fig. 3, the inlet port 23 of the cylinder 16 will cease to register with the tube 12, while the outlet port 24 will register with the discharge opening 15 and will, therefore, discharge. The ease of operation of the device is very apparent as all that is necessary to do is to operate the handle 19 backward and forward, holding it in the position shown in Fig. 2 long enough for the discharging chamber 25 to be filled, and holding it in the position shown in Fig. 3 long enough to be discharged.

What is called here the measuring chamber 25 is not intended necessarily to measure the volume of fluid with accuracy, but only approximately. The volume of this chamber is increased or diminished by a partition 26 within the cylinder 16 which is adjusted to a position by a screw 27 extending through the sleeve 18 and having a thumb nut 28 on its outer end for operating it. As the screw is operated one way or the other, the partition 26 will be moved toward or away from the left end of the cylinder 16 and thus diminish or increase the volume of the chamber 25.

The device is readily cleansed, as for instance, when used for creaming cups of coffee, by drawing out the pin 20 so that it will disengage the stop 21 and throwing the lever down farther than it is in Fig. 2, until the pin enters a hole 30 in a stop 31. Then a port 32 will register with the inlet 12 and port 33 will register with the outlet port 15 and the pin 20 and handle 19 will hold the parts in said position while water is flushed through the device for cleasing it.

The invention is:

A fluid measuring and delivering mechanism including a fixed cylindrical casing adapted to receive fluid from some source into the top thereof, said casing having one end open and having an outlet in the underside thereof, a cylindrical measuring chamber in said fixed casing provided with a plurality of inlet openings, an outlet opening, a second outlet opening opposite one of said inlet openings, a removable cap on said chamber having an outwardly extending sleeve, a cap for the fixed casing with bearings for the said sleeve centrally located in it, a screw extending through said sleeve and adapted to be turned therein, a piston secured to the end of said screw so as to fit snugly in said measuring chamber to adjust the capacity thereof, a lever for giving said measuring chamber rotary movement, a spring pushed bolt extending through said lever, a pair of stops for engaging said bolt and stopping said lever so as to bring an inlet opening and an outlet opening of the chamber alternately into registry with the inlet and outlet openings of the casing, and another stop with a recess in it adapted to receive said bolt and hold said measuring chamber with a second inlet opening and outlet opening thereof in registry with the inlet and outlet of said casing, so that a continuous flow may be maintained.

In witness whereof, we have hereunto affixed our signatures in the presence of the witnesses herein named.

EVERETT IRISH.
CLARENCE R. IRISH.

Witnesses:
J. H. WELLS,
O. M. McLAUGHLIN.